(12) United States Patent
Chiu et al.

(10) Patent No.: US 12,536,292 B2
(45) Date of Patent: Jan. 27, 2026

(54) SECURE PLACEMENT OF PROCESSING ELEMENTS

(71) Applicant: International Business Machines Corporation, Armonk, NY (US)

(72) Inventors: Henry Chiu, San jose, CA (US); Jason A. Nikolai, Rochester, MN (US); Jingdong Sun, Rochester, MN (US); Paul Gerver, Rochester, MN (US); Bradley William Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 17/215,083

(22) Filed: Mar. 29, 2021

(65) Prior Publication Data
US 2022/0309164 A1     Sep. 29, 2022

(51) Int. Cl.
*G06F 21/57*     (2013.01)
*G06F 9/50*      (2006.01)
(Continued)

(52) U.S. Cl.
CPC .......... *G06F 21/577* (2013.01); *G06F 9/5027* (2013.01); *G06F 16/24568* (2019.01); *G06F 21/62* (2013.01); *G06F 2221/034* (2013.01)

(58) Field of Classification Search
CPC . H04L 63/0428; H04L 67/1095; H04L 67/10; H04L 67/1014; H04L 67/1012; H04L 67/1093; H04L 67/1087; H04L 63/0485; H04L 63/0457; H04L 63/04; H04L 67/1008; H04L 67/1004; H04L 41/0894; H04L 41/0816; H04L 41/0813; H04L 41/0823; H04L 41/0836
See application file for complete search history.

(56) References Cited

U.S. PATENT DOCUMENTS 6,907,531 B1   6/2005   Dodd
8,060,614 B2   11/2011  Goldstein
(Continued)

OTHER PUBLICATIONS

"Policy based secure workload allocation in a distributed computing environment", An IP.com Prior Art Database Technical Disclosure, Original Publication Date: Jun. 17, 2009, IP.com No. IPCOM000184260D, IP.com Electronic Publication Date: Jun. 17, 2009, 3 pages.

(Continued)

*Primary Examiner* — Tae K Kim
(74) *Attorney, Agent, or Firm* — Stephen R Yoder

(57) ABSTRACT

At least one job in a data processing environment is split into two or more processing elements. A determination is made whether at least one processing element of the two or more processing elements include sensitive data. In response to determining that at least one processing element of the two or more processing elements includes sensitive data, a set of secure nodes in the data processing environment which are available for processing are identified. A first subset of optimal nodes in the set of secure nodes for processing the at least one processing element is determined based on a security state of each node in the set of secure nodes. The at least one processing element is assigned to one or more nodes in the first subset of optimal nodes.

15 Claims, 4 Drawing Sheets

(51) Int. Cl.
  *G06F 16/2455* (2019.01)
  *G06F 21/62* (2013.01)

(56) References Cited

U.S. PATENT DOCUMENTS

| | | | |
|---|---|---|---|
| 9,729,569 B2 | 8/2017 | Teilhet | |
| 10,303,792 B2 | 5/2019 | Fawcett | |
| 10,523,518 B2 | 12/2019 | Fawcett | |
| 2011/0179477 A1* | 7/2011 | Starnes | H04L 63/0823 |
| | | | 726/9 |
| 2015/0040229 A1 | 2/2015 | Chan | |
| 2017/0061143 A1* | 3/2017 | Rooney | G06F 21/6263 |
| 2017/0078446 A1* | 3/2017 | Barsness | G06F 9/50 |
| 2018/0018149 A1* | 1/2018 | Cook | G06F 8/70 |
| 2018/0020045 A1* | 1/2018 | Cook | G06F 8/30 |
| 2018/0077213 A1* | 3/2018 | Barsness | H04L 65/70 |
| 2018/0077214 A1* | 3/2018 | Fawcett | H04L 67/10 |
| 2018/0176275 A1* | 6/2018 | Barsness | H04L 43/16 |
| 2019/0020657 A1* | 1/2019 | Egner | H04L 9/3297 |
| 2019/0102157 A1* | 4/2019 | Caldato | G06F 9/547 |
| 2019/0124007 A1* | 4/2019 | Cook | H04L 65/80 |
| 2019/0155643 A1* | 5/2019 | Bhageria | H04L 9/008 |
| 2022/0201009 A1* | 6/2022 | Dhoble | H04L 67/34 |
| 2022/0224743 A1* | 7/2022 | Nikolai | H04L 65/61 |
| 2023/0128059 A1* | 4/2023 | Ma | G06F 3/0622 |
| | | | 711/154 |

OTHER PUBLICATIONS

"Remediation management: Prioritize and fix vulnerabilities that pose an imminent threat", IBM Security Services, Feb. 2019, 8 pages.

Bloomberg, Jason, "To Patch or Not to Patch? Surprisingly, That is the Question", Apr. 16, 2018, 6 pages, <https://www.forbes.com/sites/jasonbloomberg/2018/04/16/to-patch-or-not-to-patch-surprisingly-that-is-the-question/?sh=12127a3358fe>.

Cardelinni, Valeria, "Addressing the Challenges in Data Stream Processing", A.A. 2018/19, 34 pages.

Cheng et al., "Prioritized Security Attributes Allocation and Usage Based on the Characteristics of Data Transfer", An IP.com Prior Art Database Technical Disclosure, Original Publication Date: Jan. 8, 2009, IP.com No. IPCOM000177882D, IP.com Electronic Publication Date: Jan. 8, 2009, Copyright: Â© 2008 Motorola, Inc., 8 pages.

Disclosed Anonymously, "Methodology and Procedure for Secure Granular Authorization and Audit Implementation in Distributed Enterprise Computing Environment", An IP.com Prior Art Database Technical Disclosure, IP.com No. IPCOM000237293D, IP.com Electronic Publication Date: Jun. 11, 2014, 18 pages.

Firdhous et al., "Implementation of Security in Distributed Systems—A Comparative Study", International Journal of Computer Information Systems, vol. 2, No. 2, 2011, ISSN 2229 5208, 6 pages.

Grimes, Roger, "8 ways your patch management policy is broken (and how to fix it)", Oct. 3, 2019, 8 pages, <https://www.csoonline.com/article/3025807/why-patching-is-still-a-problem-and-how-to-fix-it.html>.

Harris, Richard, "Detecting PII and sensitive data in motion becomes a reality", Mar. 19, 2019, 13 pages, <https://appdevelopermagazine.com/detecting-pii-and-sensitive-data-in-motion-becomes-a-reality/>.

Karimov et al, "Benchmarking Distributed Stream Data Processing Systems", arXiv:1802.08496v2 [cs.DB] Jun. 24, 2019, 12 pages.

Thoma et al., "Automated Operator Placement in Distributed Data Stream Management Systems Subject to User Constraints", ICDE Workshops 2014, 7 pages, <http:/people.cs.pitt.edu/~corythoma/docs/automatedSMDB14.pdf >.

Xie et al., "SAHA: A Scheduling Algorithm for Security-Sensitive Jobs on Data Grids", Conference Paper • Jun. 2006, 7 pages, <https://www.researchgate.net/publication/4241976>.

Xie, Tao, "Welcome to Tao Xie's Homepage", Page last updated: Jul. 30, 2018, 15 pages, <https://taoxie.sdsu.edu/research.html>.

\* cited by examiner

SECURE PLACEMENT OF PROCESSING ELEMENTS

BACKGROUND

The present invention relates generally to the field of stream processing, and more particularly to providing secure placement of processing elements within a stream processing environment.

Stream processing, which is a form of data processing, is the processing of data in motion, or in other words, computing on data directly as it is produced or received. Stream processing is a big data technology. The majority of data are born as continuous streams: sensor events, user activity on a website, financial trades, and so on—all these data are created as a series of events over time and stream processing can detect conditions quickly, within a small time period of receiving the data. The detection time period varies from few milliseconds to minutes. For example, with stream processing, an alert can be received when the temperature has reached the freezing point by querying data streams coming from a temperature sensor. Before stream processing, this type of data was often stored in a database, a file system, or other forms of mass storage. Applications would query the data or compute over the data as needed. Stream processing is also called by many other names: real-time analytics, streaming analytics, Complex Event Processing, real-time streaming analytics, and event processing.

SUMMARY OF THE INVENTION

Embodiments of the present invention include an approach for providing secure placement of processing elements within a stream processing environment. In one embodiment, at least one job in a data processing environment is split into two or more processing elements. A determination is made whether at least one processing element of the two or more processing elements include sensitive data. In response to determining that at least one processing element of the two or more processing elements includes sensitive data, a set of secure nodes in the data processing environment which are available for processing are identified. A first subset of optimal nodes in the set of secure nodes for processing the at least one processing element is determined based on a security state of each node in the set of secure nodes. The at least one processing element is assigned to one or more nodes in the first subset of optimal nodes.

DETAILED DESCRIPTION

Figure 1:
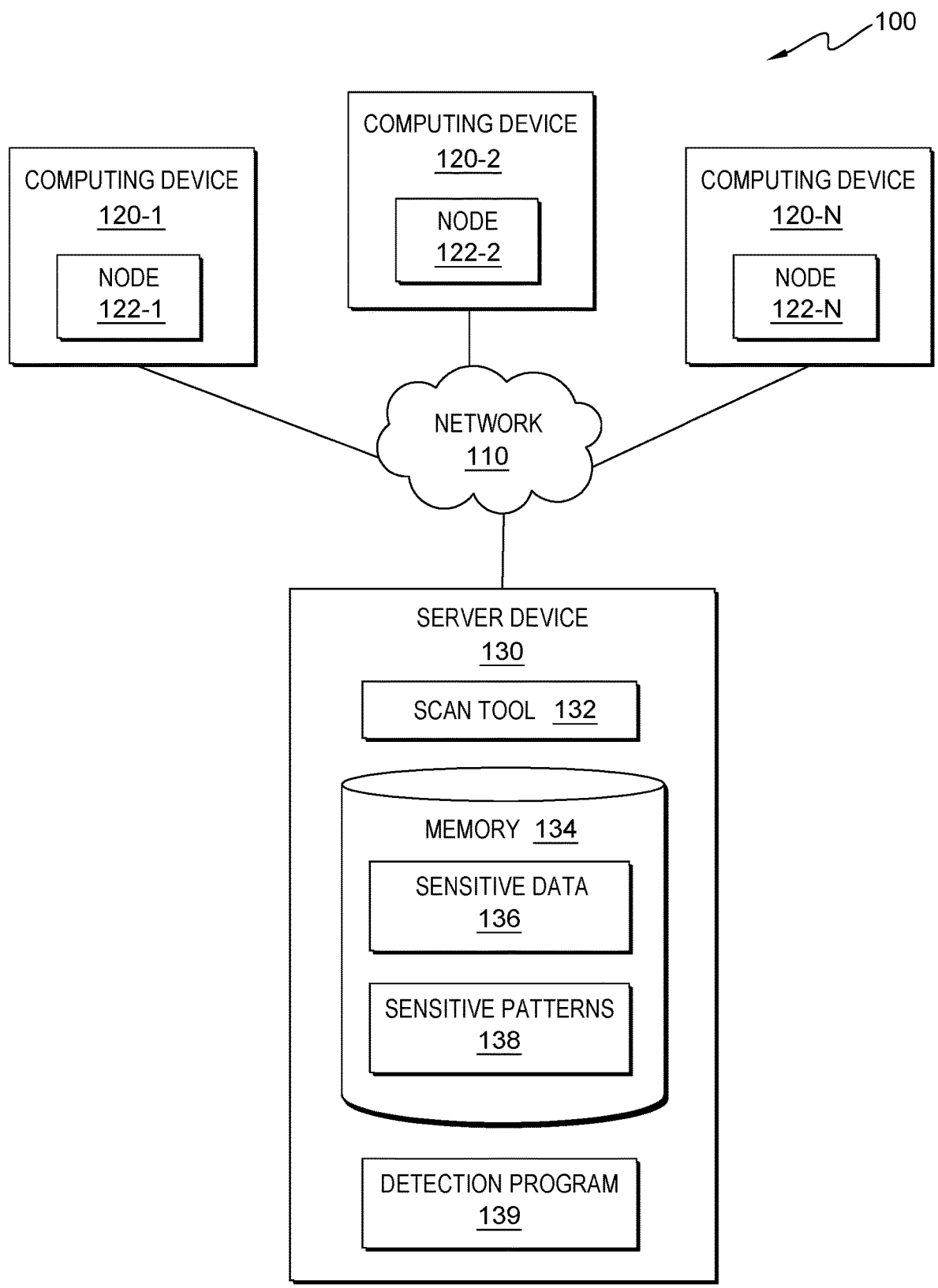
FIG. 1 depicts a functional block diagram illustrating a stream processing environment which includes a detection program, in accordance with an embodiment of the present invention.

Embodiments of the present invention recognize that the amount of available data is increasing rapidly. Sources of data include, but are not limited to, Internet of Things devices, any number of sensors (temperature, barometric pressure, wind, water level, water pressure, seismic, etc.), data from machines in various industries, social media data, and transactional data such as financial transaction data. Stream processing allows for the real-time processing of large amounts of data over multiple nodes, where the nodes are physical (e.g., bare metal), virtual (e.g., containers, virtual machines, etc.), or a combination of both. A method is needed to ensure the secure processing of sensitive data during streams processing.

Embodiments of the present invention recognize that there may be a method, computer program product, and computer system for providing secure placement of processing elements within a stream processing environment. The method, computer program product, and computer system improves the technology of stream processing by ensuring that sensitive data is processed by nodes that have no known security vulnerabilities. Sensitive data is comprised of personal information (i.e., any information relating to an identified or identifiable individual including both direct identifiers and indirect identifiers) and sensitive personal information (i.e., information that if lost, compromised, or disclosed could significantly harm, embarrass, inconvenience, or result in unfair treatment of an individual in a financial, employment or social way). Sensitive data that exceeds a sensitivity threshold (based on applicable policy/policies) is processed on the most secure nodes. By processing data in the described manner, potential risk to an organization is reduced (e.g., the likelihood of data being stolen is reduced).

In an embodiment, an indication of the start of stream processing of a data job is received. In the embodiment, the job is split into multiple processing elements (PEs). Further yet in the embodiment, a determination is made whether any of the PEs include sensitive data. Further yet in the embodiment, in response to determining that PEs include sensitive data, secure nodes which are available for processing are identified. Further yet in the embodiment, a determination is made whether any of the sensitive data exceeds a sensitivity threshold. Further yet in the embodiment, in response to determining that some of the sensitive data exceeds a sensitivity threshold, the security state of the identified nodes is determined. Further yet in the embodiment, optimal nodes are determined. Further yet in the embodiment, a node list is transmitted to a scheduler to ensure secure placement of the PEs.

According to another embodiment, nodes processing PEs are identified. In the embodiment, a determination is made whether the PEs include sensitive data. Further yet in the embodiment, in response to determining that the PEs include sensitive data, a determination is made whether the sensitive data exceeds a sensitivity threshold. Further yet in the embodiment, in response to determining that the sensitive data exceeds a sensitivity threshold, the security state of the nodes processing the PEs is determined. Further yet in the embodiment, a determination is made whether each node meets security requirements. Further yet in the embodiment, in response to determining that a node does not meet security requirement, the PEs which include sensitive data that exceeds the sensitivity threshold are relocated to more secure nodes. Further yet in the embodiment, complete processing of the PEs on the more secure nodes is confirmed.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a stream computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, stream computing environment 100 includes computing device 120-1, computing device 120-2, computing device 120-N, and server device 130 interconnected by network 110. In example embodiments, stream computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with computing device 120-1, computing device 120-2, computing device 120-N, and server device 130 over network 110.

In embodiments of the present invention, computing device 120-1, computing device 120-2, computing device 120-N, and server device 130 are connected to network 110, which enables computing device 120-1, computing device 120-2, computing device 120-N, and server device 130 to access other computing devices and/or data not directly stored on computing device 120-1, computing device 120-2, computing device 120-N, and server device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between computing device 120-1, computing device 120-2, computing device 120-N, and server device 130, and any other computing devices (not shown in FIG. 1) connected to network 110, in accordance with embodiments of the present invention. For reading ease, computing device 120-N will be used throughout this document and will refer to any instance of computing device 120-1, computing device 120-2, and computing device 120-N.

According to an embodiment, computing device 120-N may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within stream computing environment 100. According to embodiments, computing device 120-N can be a standalone computing device, a management server, a web server, a mobile computing device, or any other electronic device or computing system capable of receiving, transmitting, and processing data. In other embodiments, computing device 120-N can represent computing systems utilizing multiple computers as a server system, such as in a cloud computing environment. In certain embodiments, computing device 120-N represents a computer system utilizing clustered computers and components (e.g., database server computers, application server computers, etc.) that act as a single pool of seamless resources when accessed by elements of stream computing environment 100. In general, computing device 120-N is representative of any electronic device or combination of electronic devices capable of executing computer readable program instructions. According to one embodiment, computing device 120-N is a device that processes PEs (processing elements) in a stream computing environment. In an embodiment, stream computing environment 100 includes any number of computing device 120-N. Computing device 120-N may include internal and external hardware components as depicted and described in further detail with respect to FIG. 3, in accordance with embodiments of the present invention. In an embodiment, computing device 120-N also includes node 122-N (which refers to any instance of a processing node included on a computing device; for example, node 122-1 on computing device 120-1, node 122-2 on computing device 120-2, and node 122-N on computing device 120-N).

In an embodiment, node 122-N is a set of processing and memory resources which process data in the form of processing elements (PEs). Node 122-N is a representation of a single machine in stream computing environment 100. Node 122-N may be either a physical machine (e.g., a machine in a datacenter) or a virtual machine (e.g., processing capability hosted by a cloud provider). A scheduler, also known as a placement engine (not shown in FIG. 1) determines on which node each PE of data will run. The scheduler only considers which node 122-N, and its associated resources, are available for processing PEs; the scheduler does not consider the security posture of any node 122-N. For example, a first instance of node 122-N may include all relevant security patches based on a recent security scan while a second instance of node 122-N may include security vulnerabilities because said second instance has not been scanned for several weeks, has not had critical vulnerabilities patched, or includes vulnerabilities ranked critical, high, or medium according to a known ranking system.

According to an embodiment, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within stream computing environment 100. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of stream computing environment 100. In general, server device 130 is representative of any electronic device or combination of electronic devices capable of executing computer readable program instructions. According to one embodiment, server device 130 is a laptop computer used for electronic conferences via a collaboration application. In an embodiment, stream computing environment 100 includes any number of server device 130. Server device 130 may include internal and external hardware components as depicted and described in further detail with respect to FIG. 3, in accordance with embodiments of the present invention. In an embodiment, server device 130 also includes scan tool 132, memory 134, and detection program 139.

According to an embodiment of the present invention, scan tool 132 is a security program which evaluates the security posture (i.e., risk) of each instance of node 122-N. Scan tool 132 can examine node 122-N to determine (i) whether the proper configuration is installed, (ii) whether the appropriate protocols and daemons have been enabled/disabled, and (iii) whether critical vulnerabilities have been identified and patched (i.e., resolved). In one embodiment, scan tool 132 is included on server device 130. In other embodiments, scan tool 132 may be included on computing device 120-N or may be included on any other computing device in stream computing environment 100 (not shown in FIG. 1) that is accessible by detection program 139 over network 110.

According to an embodiment, memory 134 is storage that is written to and/or read by computing device 120-N, node 122-N, server device 130, detection program 139, and any other programs and applications on computing device 120-N and server device 130. In one embodiment, memory 134 resides on server device 130. In other embodiments, memory 134 resides on computing device 120-N, on any other device (not shown in FIG. 1) in stream computing environment 100, in cloud storage, or on another computing device accessible via network 110. In yet another embodiment, memory 134 represents multiple storage devices within server device 130. Memory 134 may be implemented using any volatile or non-volatile storage media for storing information, as known in the art. For example, memory 134 may be implemented with a tape library, optical library, one or more independent hard disk drives, multiple hard disk drives in a redundant array of independent disks (RAID), solid-state drives (SSD), or random-access memory (RAM). Similarly, memory 134 may be implemented with any suitable storage architecture known in the art, such as a relational database, an object-oriented database, or one or more tables. In an embodiment of the present invention, computing device 120-N, node 122-N, server device 130, detection program 139, and any other programs and applications (not shown in FIG. 1) operating on computing device 120-N and server device 130 may store, read, modify, or write data to memory 134. In an embodiment of the present invention, memory 134 includes sensitive data 136 and sensitive patterns 138.

In an embodiment of the present invention, sensitive data 136 is a repository of any data that is indicated to be sensitive. Data stored to sensitive data 136 includes, but is not limited to, names, addresses, birthdays, phone numbers, social security numbers, credit card numbers, and e-mail addresses. In the embodiment, all of the data stored to sensitive data 136 is labeled as being sensitive. The implementation of the label is not critical; the sensitive label can be a flag such as a "+" sign (i.e., plus sign) or an "*" (i.e., asterisk) attached to the data. For example, a social security number stored to sensitive data 136 may be formatted as "+123-45-6789" and an e-mail address may be formatted as "*user1@abcxyz.gov*".

According to an embodiment, sensitive patterns 138 is a repository of patterns and formats of sensitive data. Data stored to sensitive patterns 138 includes, but is not limited to, a social security number pattern (e.g., "xxx-yy-zzzz"), a credit card number pattern (e.g., a first brand of credit card always begins with the number "4" and is formatted as "4aaa-bbbb-cccc-dddd" while a second brand of credit card always begins with the number "3" and is formatted as "3xxx yyyyyy zzzzz"), an e-mail address format (e.g., "username@domain" where "domain" is comprised of a mail server and a top-level domain or extension), and a birthday format (e.g., "month day, year", "xx-yy-zz, "aa/bb/cccc", etc.). Based on these example formats, a data entry of "987-65-4321", which fits the social security number pattern, would be flagged as sensitive.

In an embodiment of the present invention, detection program 139 is a program, a subprogram of a larger program, an application, a plurality of applications, or mobile application software, which functions to provide secure placement of processing elements within a stream processing environment. A program is a sequence of instructions written to perform a specific task. In an embodiment, detection program 139 runs independently. In other embodiments, detection program 139 depends on system software and/or other programs (not shown in FIG. 1) to execute. According to an embodiment, detection program 139 is a cognitive system based on artificial intelligence utilizing machine learning and deep learning which determines whether processing elements (PEs) include sensitive data, whether the sensitive data exceeds a sensitivity threshold, and determines appropriate secure nodes to use for running the PEs. In one embodiment, detection program 139 functions as a stand-alone program residing on server device 130. In another embodiment, detection program 139 works in conjunction with other programs, applications, etc., found in stream computing environment 100. In yet another embodiment, detection program 139 resides on other computing devices such as computing device 120-N in stream computing environment 100, which is interconnected to server device 130 via network 110.

According to an embodiment, detection program 139 receives an indication of the start of stream processing of a data job. In the embodiment, detection program 139 splits the job into two or more processing elements (PEs). Further in the embodiment, detection program 139 determines whether the PEs include sensitive data. Further yet in the embodiment, responsive to determining that PEs include sensitive data, detection program 139 identifies secure node which are available for processing. Further yet in the embodiment, detection program 139 determines whether the sensitive data exceeds a sensitivity threshold. Further yet in the embodiment, responsive to determining that the sensitive data exceeds the sensitivity threshold, detection program 139 determines a security state of each of the identified nodes. Further yet in the embodiment, detection program 139 determines optimal nodes. Further yet in the embodiment, detection program 139 transmits a node list to a scheduler to ensure secure placement of the PEs.

In another embodiment, detection program 139 identifies one or more nodes processing PEs. In the embodiment, detection program determines whether the PEs include sensitive data. Further in the embodiment, responsive to determining that PEs include sensitive data, detection program 139 determines whether the sensitive data exceeds a sensitivity threshold. Further yet in the embodiment, detection program 139 determines a security state of each of the nodes processing PEs. Further yet in the embodiment, detection program 139 determines whether each node meets security requirements. Further yet in the embodiment, responsive to determining that nodes do not meet security requirements, detection program 139 relocates the PEs which include sensitive data that exceeds the sensitivity threshold to more secure nodes. Further yet in the embodiment, detection program 139 confirms the complete processing of the PEs on the more secure nodes.

Figure 2A:
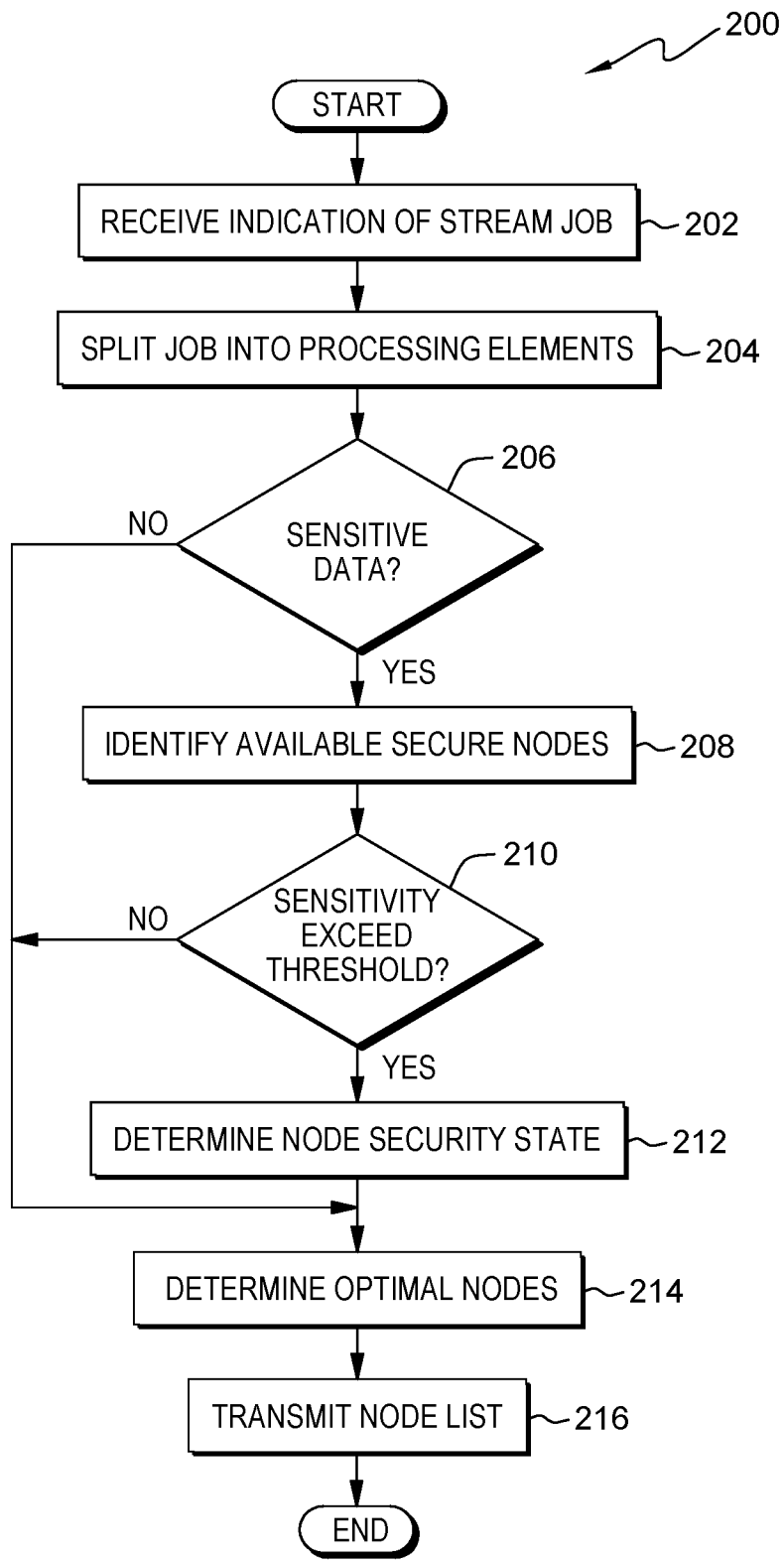
FIG. 2A is a flowchart depicting operational steps of a program for providing secure placement of processing elements within a stream processing environment at the beginning of the processing, on a computing device within the stream processing environment of FIG. 1, in accordance with an embodiment of the present invention.

FIG. 2A is a flowchart of workflow 200 depicting operational steps for providing secure placement of processing elements within a stream processing environment at the beginning of the processing. In one embodiment, the method of workflow 200 is performed by detection program 139 on server device 130. In an alternative embodiment, the method of workflow 200 is performed by any other program in stream computing environment 100 working with detection program 139. In an embodiment, a user of server device 130 invokes workflow 200 upon accessing detection program 139. In another embodiment, detection program 139 is invoked by a user of computing device 120-N.

In an embodiment, detection program 139 receives an indication of stream processing (step 202). In other words, detection program 139 receives an indication that data processing is about to occur in a stream processing environment. According to an embodiment, detection program 139 receives the indication from one of a user or a computing device within the stream processing environment. A simplified explanation of stream processing is as follows: a data stream, comprised of a running sequence of tuples, flows into an operator which processes the tuples creating an output flow of tuples. Each tuple is a sequence of attributes and an attribute is a named value. For example, for a financial transaction, a financial transaction tuple name contains {name=<account name>,number=<account number>,amount=<transfer amount> where name is the name of person making the financial transaction, number is a credit card number (i.e., the account number), and amount is the amount of the financial transaction). In this example, the operator manipulating the tuples may be reconciling purchases made by the user to create a monthly credit card statement. The data stream of tuples is processed in operators which reside in processing elements (PEs). PEs are placed on nodes or hosts. One or more PEs can run on a particular node or host. One or more PEs processing, for example, "platinum" credit card data may be placed on a particular host or node. In an embodiment, detection program 139 on server device 130 receives an indication over network 110 of the start of data processing on computing device 120-N in stream computing environment 100 from a user of computing device 120-N. For example, a program on a company server receives an indication from a datacenter administrator of the start of stream data processing of credit card purchasing information at the company-owned, offsite datacenter.

According to an embodiment of the present invention, detection program 139 splits the job(s) into processing elements (PEs) (step 204). In other words, detection program 139 divides the job(s) to be processed within the stream processing environment into individual execution units known as PEs. In an embodiment, each PE includes an operator and stream data. Some of the data included in a first PE may be data that is not considered to be sensitive (e.g., weather data, machine data, etc.) while other data in a second PE may be considered sensitive (social security numbers, credit card numbers, etc.). According to an embodiment, detection program 139 splits the job to be processed on node 122-N on computing device 120-N into PEs. For example, the program on the company server splits the credit card purchasing information into PEs, where each PE is associated with a specific person.

In an embodiment, detection program 139 determines sensitive data (decision step 206). In other words, detection program 139 determines whether the PEs include sensitive data. According to an embodiment, detection program 139 determines sensitive data by (i) recognizing a label attached to the data and (ii) recognizing a known pattern (i.e., format) of sensitive data. An example label is a double plus sign (i.e., "++") attached to the data (e.g., "++4444-6666-2222-8888") and an example known format is that of a social security number (i.e., "xxx-aa-zzzz"). Sensitive data is comprised of personal information (i.e., any information relating to an identified or identifiable individual including both direct identifiers and indirect identifiers) and sensitive personal information (i.e., information that if lost, compromised, or disclosed could significantly harm, embarrass, inconvenience, or result in unfair treatment of an individual in a financial, employment or social way). Examples of sensitive information include, but are not limited to, a person's name and an employee serial number (both direct identifiers) and a person's age and a person's zip code (both indirect identifiers)). Examples of personal sensitive information include, but are not limited to, financial information (e.g., bank account number and credit card number), date of birth, ethnicity, biometric data (e.g., a fingerprint), medical/health information (e.g., blood type, drug/alcohol testing results, and disability accommodations), political views, and ideological beliefs. In one embodiment (decision step 206, NO branch), detection program 139 determines that there is no sensitive data in the PEs; therefore, detection program 139 proceeds to step 214 to determine optimal nodes. In the embodiment (decision step 206, YES branch), detection program 139 determines that there is sensitive data in the PEs; therefore, detection program 139 proceeds to step 208 to identify available secure nodes.

According to an embodiment, detection program 139 identifies available secure nodes (step 208). In other words, responsive to determining that sensitive data is included in the PEs, detection program 139 identifies secure nodes in the stream processing environment that are available to process the PEs. In an embodiment, detection program 139 identifies secure nodes by retrieving data stored to a cache; the retrieved data indicates which of the nodes in the stream processing environment have been recently scanned for vulnerabilities. The more recent a security scan of a node, the more secure the node is from a vulnerability perspective. Further, nodes that do not contain vulnerabilities that exceed an application threshold (e.g., no vulnerabilities ranked critical, high, or medium per a known ranking system) are also more secure than nodes which include said vulnerabilities. A node that has not been scanned in a pre-defined period of time (e.g., two weeks, one month, etc.) or longer is considered not secure. According to an embodiment, detection program 139 identifies the available secure nodes such as node 122-N within stream computing environment 100. For example, the program on the company server identifies nodes 'A1' and 'A2' within the datacenter as being available and secure.

In an embodiment, detection program 139 determines whether a sensitivity threshold is exceeded (decision step 210). In other words, responsive to determining that the PEs include sensitive data and identifying available and secure nodes within the stream processing environment, detection program 139 determines whether the determined sensitive data exceeds a sensitivity threshold. According to an embodiment of the present invention, a sensitivity threshold is based on one or more policies governing sensitive data. Examples of the public policies include, but are not limited to, the European Union's General Data Protection Regulation (GDPR), the Health Insurance Portability and Accountability Act (HIPAA) in the United States, and the Payment Card Industry Data Security Standard (PCI-DSS) which is maintained by a global organization. Each of these policies may describe how certain sensitive data is to be handled. In an embodiment (decision step 210, NO branch), detection program 139 determines that the sensitive data does not exceed a sensitivity threshold; therefore, detection program 139 proceeds to step 214 to determine optimal nodes). In the embodiment (decision step 210, YES branch), detection program 139 determines that the sensitive data does exceed a sensitivity threshold; therefore, detection program 139 proceeds to step 212 to determine a security state of each of the available secure nodes.

According to an embodiment, detection program 139 determines node security state (step 212). In other words, responsive to determining that sensitive data exceeds a sensitivity threshold, detection program 139 determines a security state for each of the identified, available secure nodes. In an embodiment, the security state of a node is a measure of that node's security vulnerabilities and the associated risks of said vulnerabilities. Detection program 139 determines the security state of a node by (i) calling an application programming interface (API) to assess the security state of the node in real-time or (ii) checking a reference database that tracks security vulnerabilities and exposures. Not all vulnerabilities are cause for concern; some may be considered acceptable risk. According to an embodiment, detection program 139 determines the security state of each node such as node 122-N on computing device 120-N in streams computing environment 100. For example, the program on the company server determines the security state of node 'A' and of node 'B' in the datacenter.

In an embodiment, detection program 139 determines optimal nodes (step 214). In other words, detection program 139 determines the optimal nodes for processing the sensitive data that exceeds the sensitivity threshold by matching the sensitive data (and the associated PEs) to nodes in the stream processing environment based on the determined security state of the nodes, the type of sensitive data, and the associated policy governing the sensitive data. In one embodiment, the optimal nodes include a first subset of optimal nodes for processing sensitive data that exceeds a sensitivity threshold and a second subset of optimal nodes to process data that is not sensitive. According to an embodiment, detection program 139 matches the most sensitive data (based on policy) to the most secure nodes available (based on security state). In an embodiment, detection program 139 on server device 130 determines the optimal nodes in streams computing environment 100 by matching the sensitive data to the nodes based on the determined security state of the nodes. For example, the program on the company server matches the credit card data to node 'B' as node 'B' has a higher security state when compared to node 'A'.

According to an embodiment of the present invention, detection program 139 transmits node list (step 216). In other words, detection program 139 transmits a node list, which indicates the determined optimal nodes and associated node match between data (i.e., PEs) and nodes, to a scheduler in the streams processing environment. In an embodiment, the scheduler assigns the PEs to the optimal nodes per the transmitted node list. Once the PEs are assigned to the optimal nodes per the node list, processing of the PEs occurs per streams processing protocols. According to an embodiment, detection program 139 on server device 130 transmits the node list of determined optimal nodes to a scheduler (not shown in FIG. 1) available in streams computing environment 100. For example, the program on the company server transmits a node list to an available scheduler indicating that the credit cart data processing must take place on node 'B'.

In another embodiment, rather than transmitting the determined optimal node list to a scheduler, detection program 139 assigns the PEs to the determined optimal nodes per the node list. Thus, after determining the optimal nodes and matching the data (i.e., PEs) to said nodes, detection program 139 assigns the data to the optimal nodes dynamically without the use of a scheduler. Said dynamic assignment reduces the overall processing time since transmission of the node list is eliminated as well as any latency associated with the scheduler. According to an embodiment, detection program 139 on server device 130 assigns the data being processed in streams computing environment 100 to node 122-N on computing device 120-N which was determined to be the optimal node for the data. For example, the program on the company server assigns the credit card processing to node 'B' in the datacenter.

Figure 2B:
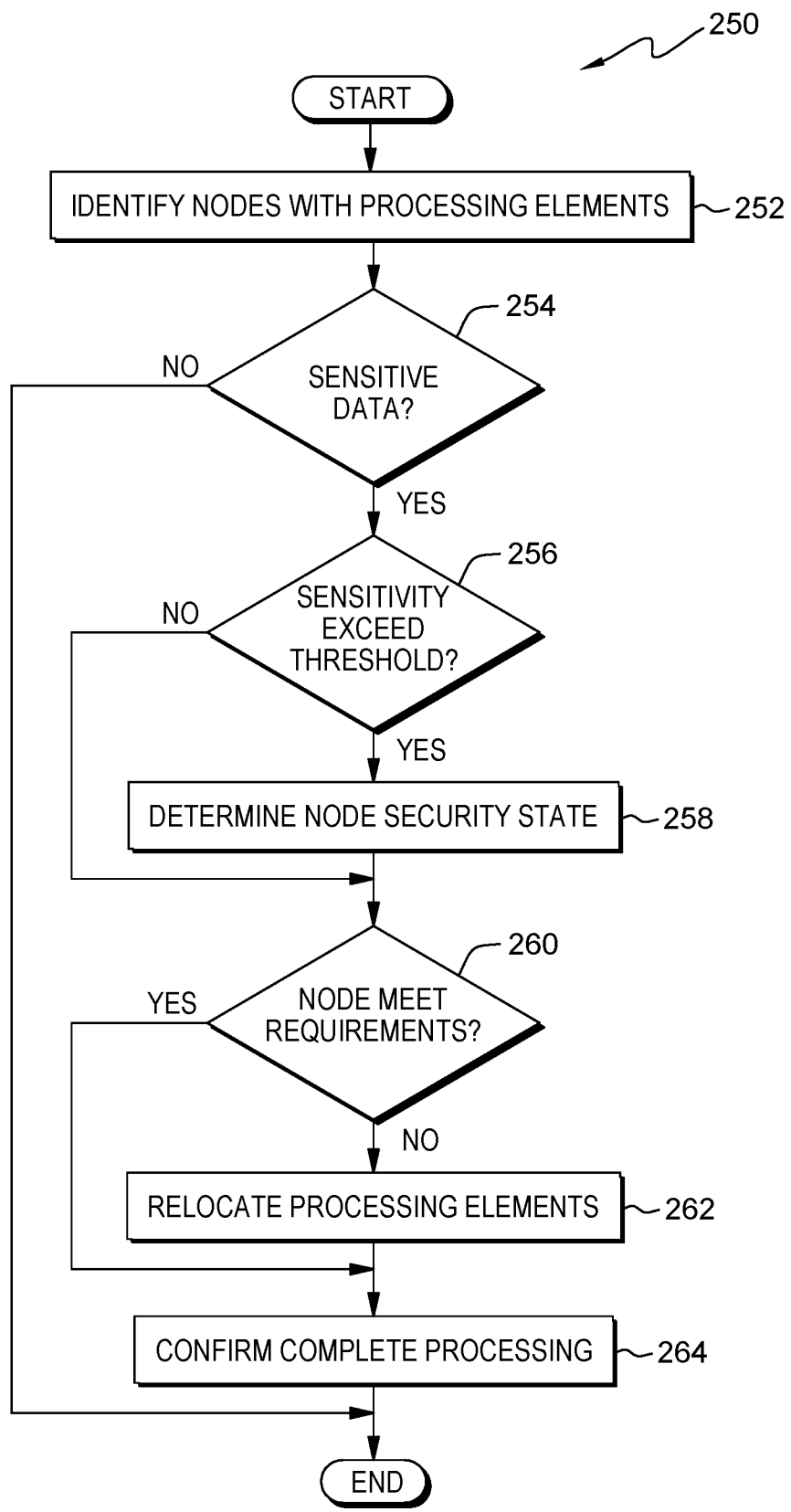
FIG. 2B is a flowchart depicting operational steps of a program for providing secure placement of processing elements within a stream processing environment when the processing has already started, on a computing device within the stream processing environment of FIG. 1, in accordance with an embodiment of the present invention.

FIG. 2B is a flowchart of workflow 250 depicting operational steps for providing secure placement of processing elements within a stream processing environment when the processing has already started. In one embodiment, the method of workflow 250 is performed by detection program 139 on server device 130. In an alternative embodiment, the method of workflow 250 is performed by any other program in stream computing environment 100 working with detection program 139. In an embodiment, a user of server device 130 invokes workflow 250 upon accessing detection program 139. In another embodiment, detection program 139 is invoked by a user of computing device 120-N. In yet another embodiment, workflow 200 is dynamically invoked upon a user powering on a computing device such as a laptop computer.

In an embodiment, detection program 139 identifies nodes with PEs (step 252). In other words, detection program 139 identifies which nodes in a streams processing environment are processing PEs (and therefore, data). According to an embodiment, detection program 139 identifies the nodes based on whether the node is actively processing data, or the node is idle. The active nodes include PEs while the idle nodes do not include PEs. The PEs may include sensitive data or data not considered to be sensitive. In an embodiment, detection program 139 on server device 130 identifies node 122-N on computing device 120-N to have PEs. For example, a program on a company server identifies that nodes 'X', 'Y', and 'Z' at the datacenter are processing PEs.

According to an embodiment of the present invention, detection program 139 determines sensitive data (decision step 254). In other words, detection program 139 determines whether any of the PEs processing on the identified nodes comprises sensitive data. In an embodiment, detection program 139 makes the determination based on (i) the data being labeled (as previously described in this document) and (ii) a known pattern (or format) of sensitive data (as previously discussed in this document). An example of a sensitive data label for an e-mail address is "*SD*john.doe@a1b2c3.com" and an example known pattern for a social security number is "zzz-xx-yyyy". In an embodiment (decision step 254, NO branch), detection program 139 determines that there is no sensitive data included in the PEs being processed; therefore, detection program 139 ends. In the embodiment (decision step 254, YES branch), detection program 139 determines that there is sensitive data included in the PEs being processed; therefore, detection program 139 proceeds to decision step 256 to determine whether the sensitive data exceeds a sensitivity threshold.

In an embodiment, detection program 139 determines whether data exceeds a sensitivity threshold (decision step 256). In other words, responsive to determining that there is sensitive data in the PEs being processed, detection program 139 determines whether the sensitive data exceeds a sensitivity threshold. As previously discussed in this document, the sensitivity threshold is based on one or more policies governing sensitive data. In an embodiment (decision step 256, NO branch), detection program 139 determines that the sensitive data does not exceed a sensitivity threshold; therefore, detection program 139 proceeds to step 260 to determine whether the identified nodes with PEs meet requirements. In the embodiment (decision step 256, YES branch), detection program 139 determines that the sensitive data does exceed a sensitivity threshold; therefore, detection program 139 proceeds to step 258 to determine a security state of each of the identified nodes with PEs.

According to an embodiment, detection program 139 determines node security state (step 258). In other words, responsive to determining that sensitive data exceeds a sensitivity threshold, detection program 139 determines a security state for each of the identified nodes processing PEs. As previously discussed in this document, the security state of a node is a measure of that node's security vulnerabilities and the associated risks of said vulnerabilities and detection program 139 determines the security state of a node by (i) calling an application programming interface (API) to assess the security state of the node in real-time or (ii) checking a reference database that tracks security vulnerabilities and exposures. According to an embodiment, detection program 139 determines the security state of each node such as node 122-N on computing device 120-N in streams computing environment 100. For example, the program on the company server determines the security state of nodes 'X', 'Y', and 'Z' in the datacenter.

In an embodiment, detection program 139 determines whether the nodes meet requirements (decision step 260). In other words, based on the determined security state of each node, detection program 139 determines whether each node meets the mandatory security requirements for processing the sensitive data that exceeds a sensitivity threshold. According to an embodiment, detection program 139 makes the determination based on (i) an API call which causes a real-time security scan of a node to occur and checking the scan results against the determined security state of the node or (ii) checking the determined security state of the nodes against a reference database that tracks security vulnerabilities and exposures. In an embodiment (decision step 260, YES branch), detection program 139 determines that the nodes do meet the mandatory security requirements for processing the sensitive data that exceeds a sensitivity threshold; therefore, detection program 139 proceeds to step 264 to confirm complete processing. In the embodiment (decision step 260, NO branch), detection program 139 determines that the nodes do not meet the mandatory security requirements for processing the sensitive data that exceeds a sensitivity threshold; therefore, detection program 139 proceeds to step 262 to relocate the PEs.

According to an embodiment, detection program 139 relocates PEs (step 262). In other words, responsive to determining that a node processing a PE that includes sensitive data which exceeds a sensitivity threshold does not meet mandatory security requirement, detection program 139 relocates the PE to a new node. In an embodiment, detection program 139 relocates the PE from the node which does not meet security requirements to a new node within the streams processing environment which does meet the mandatory security requirements. The node which meets the mandatory security requirements may be active or said node may be idle (said node is preferably idle so that processing of the relocated PE begins immediately). According to an embodiment, detection program 139 on server device 130 relocates via network 110 a PE processing on node 122-N on computing device 120-N to node 122-1 on computing device 120-1. For example, the program on the company server relocates the PE being processed on node 'X' to node 'Y' as node 'Y' meets the security requirements of the sensitive data included in the PE which was located on node 'X'. If node 'Y' has sufficient computing resources available, processing of the relocated PE begins immediately; if sufficient resources are not available, processing of the relocated PE will not start until resources become available on node 'Y'. The PE being relocated could not be relocated to node 'Z' as node 'Z' does not meet the necessary security requirements.

In an embodiment, detection program 139 confirms completed processing (step 264). In other words, detection program 139 confirms that the processing of any relocated PEs completes on the node said PEs were relocated to and also confirms that any non-relocated PEs also complete processing. According to an embodiment, the confirmation is an indication from the respective nodes that the processing has completed. In an embodiment, detection program 139 confirms that the PE relocated to node 122-1 on computing device 120-1 has completed processing based on an indication from node 122-1 received via network 110 by detection program 139 on server device 130. For example, the program on the company server receives a first indication from node 'Y' that the relocated PE has completed processing and a second indication from node 'Y' that another PE is still processing. Further, the program receives an indication from node 'Z' that said node has also completed the processing of a PE. The relocated PE, originally processing on node 'X', was the only PE on node 'X'; therefore, the program does not receive any indication from node 'X'.

Figure 3:
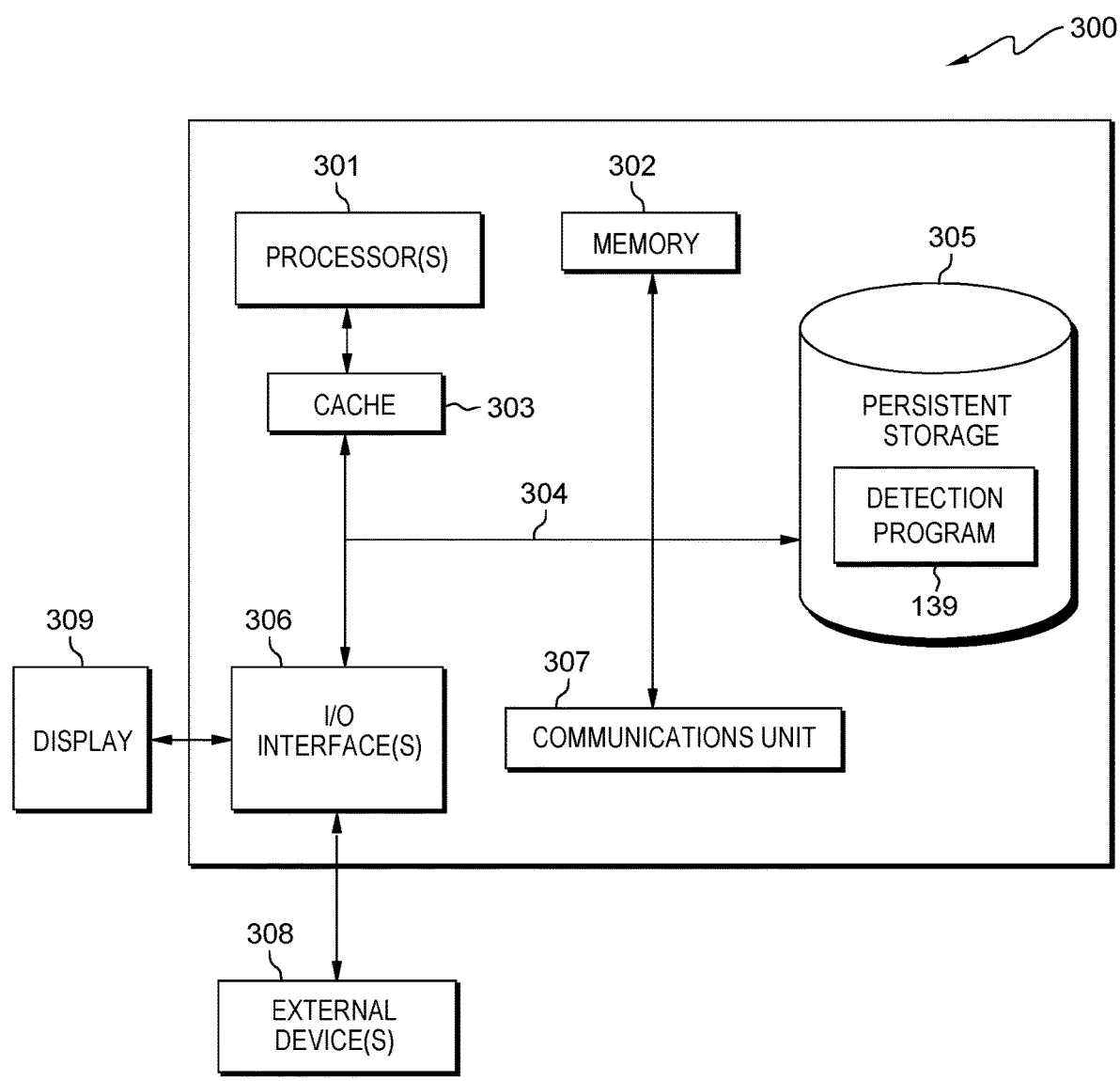
FIG. 3 depicts a block diagram of components of a computing device executing a detection program within the stream processing environment of FIG. 1, in accordance with an embodiment of the present invention.

FIG. 3 depicts computer system 300, which is an example of a system that includes detection program 139. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
splitting at least one data job in a data stream of a stream processing environment into two or more data tuples for individual processing via a plurality of processing elements, the plurality of processing elements including operators and at least one data tuple of the two or more data tuples;
determining whether the plurality of processing elements includes sensitive data tuples containing data having a characteristic of sensitive data;
establishing a set of secure nodes, each secure node having been scanned for vulnerabilities within a pre-defined period of time;
responsive to determining that a first processing element of the plurality of processing elements includes a first sensitive data tuple, matching a first secure node with the first processing element, the first secure node meeting a security requirement of the first processing element by having been scanned for vulnerabilities within the pre-defined period of time;
transmitting a node list comprised of the set of secure nodes and associated node matches, including the match between the first secure node and the first processing element, to a scheduler included in the stream processing environment; and
deploying, by the scheduler, the first processing element to the first secure node according to the node list.

2. The method of claim 1, further comprising:
determining whether the first sensitive data tuple exceeds a sensitivity threshold;
responsive to determining that the first sensitive data tuple exceeds the sensitivity threshold, determining security states corresponding to the set of secure nodes; and
selecting a first optimal node in the set of secure nodes based on the corresponding security states of the set of secure nodes.

3. The method of claim 1, wherein:
the first sensitive data tuple is comprised of information relating to an identified or an identifiable individual including both direct identifiers and indirect identifiers.

4. The method of claim 2, wherein the sensitivity threshold is based on one or more policies governing sensitive data.

5. The method of claim 2, wherein:
the corresponding security states of the set of secure nodes are measures of security vulnerabilities of individual nodes of the set of secure nodes and associated risks of the security vulnerabilities; and
the corresponding security states are determined by at least one of (i) an application programming interface which assesses the security states of the individual nodes in real-time and (ii) a check of a reference database that tracks security vulnerabilities and exposures in the stream processing environment.

6. A computer system, the computer system comprising:
one or more computer processors;
one or more computer readable storage media; and
the one or more processors structured, located, connected, and/or programmed to run program instructions stored on the one or more computer readable storage media; and
the program instructions which, when executed by at least one of the one or more computer processors, cause the at least one of the one or more computer processors to perform a process, the program instructions comprising:
program instructions to split at least one data job in a data stream of a stream processing environment into two or more data tuples for individual processing via a plurality of processing elements, the plurality of processing elements including operators and at least one data tuple of the two or more data tuples;

program instructions to determine whether the plurality of processing elements includes sensitive data tuples containing data having a characteristic of sensitive data;

program instructions to establish a set of secure nodes, each secure node having been scanned for vulnerabilities within a pre-defined period of time;

program instructions to, responsive to determining that a first processing element of the plurality of processing elements includes a first sensitive data tuple, match a first secure node with the first processing element, the first secure node meeting a security requirement of the first processing element by having been scanned for vulnerabilities within the pre-defined period of time;

program instructions to transmit a node list comprised of the set of secure nodes and associated node matches, including the match between the first secure node and the first processing element, to a scheduler included in the stream processing environment; and program instructions to deploy, by the scheduler, the first processing element to the first secure node according to the node list.

7. The computer system of claim 6, the program instructions further comprising:

program instructions to determine whether the first sensitive data tuple exceeds a sensitivity threshold;

program instructions to, responsive to determining that the first sensitive data tuple exceeds the sensitivity threshold, determine security states corresponding to the set of secure nodes; and program instructions to select first optimal node in the set of secure nodes based on the corresponding security states of the set of secure nodes.

8. The computer system of claim 6, wherein:

the first sensitive data tuple is comprised of information relating to an identified or an identifiable individual including both direct identifiers and indirect identifiers.

9. The computer system of claim 7, wherein the sensitivity threshold is based on one or more policies governing sensitive data.

10. The computer system of claim 7, wherein:

the corresponding security states of the set of secure nodes are measures of security vulnerabilities of individual nodes of the set of secure nodes and associated risks of the security vulnerabilities; and the corresponding security states are determined by at least one of (i) an application programming interface which assesses the security states of the individual nodes in real-time and (ii) a check of a reference database that tracks security vulnerabilities and exposures in the stream processing environment.

11. A computer implemented method comprising:

identifying a plurality of nodes in a stream processing environment, the plurality of nodes including processing elements actively processing data tuples;

determining whether the processing elements on the plurality of nodes include any sensitive data tuples defined as being sensitive data, sensitive data being defined by matching a known character pattern;

responsive to determining that a first processing element on a first node includes a first sensitive data tuple, determining whether the first sensitive data tuple exceeds a sensitivity threshold according to a policy;

responsive to determining that the first sensitive data tuple exceeds the sensitivity threshold, determining whether the first node of the plurality of nodes meets a security requirement for processing the first sensitive data tuple according to a determined security state of the first node, wherein meeting the security requirement is based on the determined security state of the first node indicating a most recent security scan of the first node occurred within a pre-defined period of time; and responsive to determining that the first node does not meet the security requirement, matching a new node of the plurality of nodes with the first processing element, included on the first node, the new node meeting the security requirement according to a determined security state of the new node;

transmitting a list of nodes having been scanned for vulnerabilities within the pre-defined period of time and associated node matches, including the matching new node with the first processing element, to a scheduler included in the stream processing environment; and relocating, by the scheduler, the first processing element to the new node according to the list of nodes.

12. The method of claim 11, further comprising:

confirming complete processing of the relocated first processing element by the new node.

13. The method of claim 11, wherein:

the new node has a status of (i) an idle status such that processing of the relocated first processing element begins immediately; or (ii) an active status.

14. The method of claim 11, wherein determining security states corresponding to the plurality of nodes includes:

creating the list of nodes having been scanned for vulnerabilities within the pre-defined period of time; and identifying security states corresponding to the plurality of nodes with reference to the list of nodes.

15. The method of claim 11, further comprising:

responsive to determining that the first node does not meet the security requirement, determining security states corresponding to the plurality of nodes, including the new node, a security state of a node indicating when a most recent scan for vulnerabilities was performed on the node.

* * * * *